(No Model.)

W. J. REYNOLDS.
NUT LOCK.

No. 590,628. Patented Sept. 28, 1897.

Witnesses
F. Huser.
Edwin Cruse.

Inventor
Walter J. Reynolds,

By his Attorneys,
C. A. Snow & Co.

UNITED STATES PATENT OFFICE.

WALTER JAMES REYNOLDS, OF DAVISVILLE, RHODE ISLAND.

NUT-LOCK.

SPECIFICATION forming part of Letters Patent No. 590,628, dated September 28, 1897.

Application filed April 10, 1896. Serial No. 587,042. (No model.)

*To all whom it may concern:*

Be it known that I, WALTER JAMES REYNOLDS, a citizen of the United States, residing at Davisville, in the county of Washington and State of Rhode Island, have invented a new and useful Nut-Lock, of which the following is a specification.

The invention relates to improvements in nut-locks.

The object of the present invention is to improve the construction of nut-locks and to provide a simple, inexpensive, and efficient device which will not necessitate any change in the construction of the ordinary bolt and nut and which will be capable of securely locking a nut against accidental unscrewing.

A further object of the invention is to provide a nut-lock which will permit a nut to be unscrewed when the proper force is applied without injuring it or the nut or the bolt.

The invention consists in the construction and novel combination and arrangement of parts, hereinafter fully described, illustrated in the accompanying drawings, and pointed out in the claim hereto appended.

Figure 1:
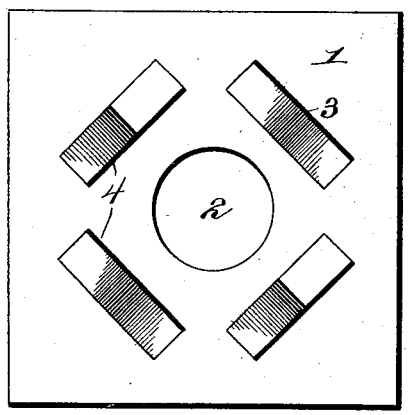
Figure 2:
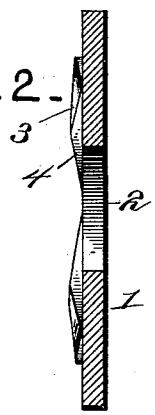
Figure 3:
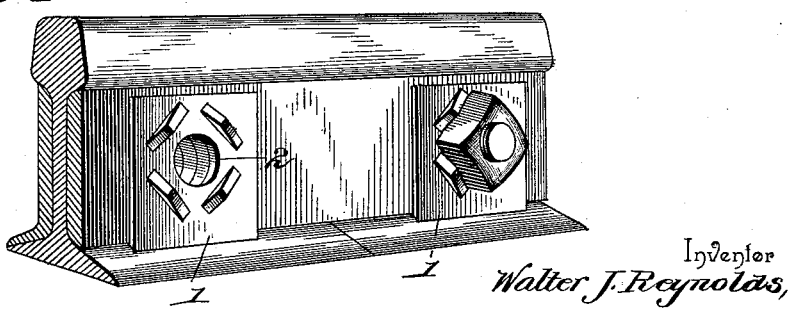

In the drawings, Figure 1 is a front elevation of a nut-lock constructed in accordance with this invention. Fig. 2 is a central sectional view of the same. Fig. 3 is a perspective view of a portion of a rail-joint, illustrating the operation of the nut-lock.

Like numerals of reference designate corresponding parts in all the figures of the drawings.

1 designates a locking-plate constructed of suitable metal, preferably arranged in the form of a washer and provided with a central bolt-receiving opening 2, and although the locking-plate is shown rectangular in the accompanying drawings, yet it may be of any other desired form. The locking-plate, which is rigid or inelastic, is provided with a series of lugs or bosses 3, arranged in rectangular form around the bolt-receiving opening, conforming to the configuration of a nut and forming a nut-socket, whereby when the nut is forced into the socket it is locked against accidental unscrewing. The lugs or bosses 3, which are oblong in plan view and triangular in side elevation, present straight inner edges 4 to a nut and form stops for engaging the straight side faces of the same, and they are oppositely beveled, as clearly illustrated in Fig. 2 of the accompanying drawings, to enable a nut to be readily forced over them by a wrench. By having the lugs or bosses oppositely beveled the nut may when desired be readily removed by a wrench, which will enable it to be forced backward up the adjacent inclined faces of the stops or lugs, but it will be readily apparent that a nut cannot accidentally ride up the inclined faces of the lugs or stops, and that when arranged within the series of lugs or stops it is absolutely locked against accidental unscrewing. Instead of constructing the locking-plate square, as illustrated in the accompanying drawings, it may be made oblong or any other desired shape. The lugs or bosses which form the stops may be cast integral with the locking-plate, but they are preferably stamped up from the locking-plate by forcing the latter outward from the inner face, as will be readily understood.

It will be seen that the nut-lock is exceedingly simple and inexpensive in construction, that it is adapted to be readily applied to bolts and nuts of the ordinary construction, and that it does not necessitate any change in the construction of them. It will also be apparent that it is capable of absolutely preventing a nut from accidentally unscrewing and of enabling the same to be readily removed without injuring it or the bolt or the nut.

What I claim is—

A nut-lock comprising a stationary unyielding locking-plate having its entire inner face flat, and designed to fit solidly against a fish-plate or similar supporting-surface, and provided with a bolt-receiving opening, and a series of solid unyielding lugs projecting outwardly from the locking-plate and arranged around the bolt-receiving opening to form a nut-receiving socket, the projections being triangular in side elevation to provide reversely-arranged and long gradual bevels on the upper surface of the projections, and oblong in plan view with straight inner faces extending upwardly at a right angle to the face of the plate, and the inner faces of the oppositely-arranged projections being parallel to each other, whereby a nut may be forced by a wrench over the inclined upper
5 surface of the projections in either direction but will lock against accidental displacement by the engagement of the parallel straight inner edges of the opposite projections with the opposite sides of the nut, substantially as described.

WALTER JAMES REYNOLDS.

Witnesses:
JOHN DOWELL,
GEO. C. BENGENER.